(12) United States Patent
Rhyu et al.

(10) Patent No.: US 10,390,107 B2
(45) Date of Patent: *Aug. 20, 2019

(54) APPARATUS AND METHOD FOR TRANSCEIVING SCENE COMPOSITION INFORMATION IN MULTIMEDIA COMMUNICATION SYSTEM

(71) Applicants: Samsung Electronics Co., Ltd., Suwon-si, Gyeonggi-do (KR); UNIVERSITY-INDUSTRY COOPERATION GROUP OF KYUNG HEE UNIVERSITY, Yongin-si, Gyeonggi-do (KR)

(72) Inventors: Sung-Ryeul Rhyu, Yongin-si (KR); Min-Woo Cho, Seoul (KR); Kyung-Mo Park, Seoul (KR); Sung-Oh Hwang, Yongin-si (KR); Kyu-Heon Kim, Seoul (KR); Byeong-Cheol Kim, Pohang-si (KR); Gwang-Hoon Park, Seongnam-si (KR); Jeong-Wook Park, Suwon-si (KR); Doug-Young Suh, Seongnam-si (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,142

(22) Filed: Sep. 28, 2017

(65) Prior Publication Data

US 2018/0020267 A1 Jan. 18, 2018

Related U.S. Application Data

(63) Continuation of application No. 14/376,548, filed as application No. PCT/KR2013/000890 on Feb. 4, 2013, now Pat. No. 9,794,648.

(30) Foreign Application Priority Data

Feb. 2, 2012 (KR) ........................ 10-2012-0010870

(51) Int. Cl.
*H04N 21/84* (2011.01)
*H04N 21/234* (2011.01)
(Continued)

(52) U.S. Cl.
CPC ......... *H04N 21/84* (2013.01); *H04N 21/2353* (2013.01); *H04N 21/23412* (2013.01); *H04N 21/435* (2013.01)

(58) Field of Classification Search
None
See application file for complete search history.

(56) References Cited

U.S. PATENT DOCUMENTS 6,751,486 B1 6/2004 Guillot et al.
7,801,573 B2 9/2010 Yazdi et al.
(Continued)

FOREIGN PATENT DOCUMENTS

JP 06-124735 A 5/1994
JP 09-017456 A 1/1997
(Continued)

*Primary Examiner* — Omar S Parra
(74) *Attorney, Agent, or Firm* — Jefferson IP Law, LLP

(57) ABSTRACT

A method for transmitting scene composition information from an apparatus therefor in a multimedia communication system is provided. The method includes generating scene composition information comprising media attributes information and temporal information, and transmitting the scene composition information, wherein the media attributes information and temporal information is separated into different formats.

2 Claims, 7 Drawing Sheets

(51) Int. Cl.
*H04N 21/235* (2011.01)
*H04N 21/435* (2011.01)

(56) References Cited

U.S. PATENT DOCUMENTS

| | | | |
|---|---|---|---|
| 2009/0122134 A1 | 5/2009 | Joung et al. | |
| 2009/0147139 A1* | 6/2009 | Watanabe | H04N 5/45 |
| | | | 348/564 |
| 2009/0154497 A1 | 6/2009 | Kim et al. | |
| 2009/0265603 A1* | 10/2009 | Hwang | H04N 7/24 |
| | | | 715/201 |
| 2010/0002763 A1* | 1/2010 | Joung | H04N 21/23412 |
| | | | 375/240.01 |
| 2011/0145697 A1 | 6/2011 | Cha et al. | |
| 2012/0128241 A1* | 5/2012 | Jung | G06K 9/00711 |
| | | | 382/165 |
| 2012/0240174 A1 | 9/2012 | Rhyu et al. | |
| 2013/0024894 A1 | 1/2013 | Eyer | |

FOREIGN PATENT DOCUMENTS

| | | |
|---|---|---|
| JP | 10-125395 A | 5/1998 |
| JP | 2000-134808 A | 5/2000 |
| JP | 2002-374554 A | 12/2002 |
| JP | 2003-009409 A | 1/2003 |
| JP | 2003-134680 A | 5/2003 |
| JP | 2003-169121 A | 6/2003 |
| JP | 2003-257499 A | 9/2003 |
| JP | 2003-319566 A | 11/2003 |
| JP | 2004-165831 A | 6/2004 |
| JP | 2004-304978 A | 10/2004 |
| JP | 2005-110475 A | 4/2005 |
| JP | 2006-050789 A | 2/2006 |
| JP | 2006-134755 A | 5/2006 |
| JP | 2008-005610 A | 1/2008 |
| JP | 2008-306781 A | 12/2008 |
| JP | 2009-189169 A | 8/2009 |
| JP | 2009-278798 A | 11/2009 |
| JP | 2011-254615 A | 12/2011 |
| KR | 10-2008-0027750 A | 3/2008 |
| KR | 10-2008-0077110 A | 8/2008 |
| KR | 10-2008-0114618 A | 12/2008 |
| KR | 10-2009-0040245 A | 4/2009 |
| KR | 10-2009-0081142 A | 7/2009 |
| KR | 10-2010-0008349 A | 1/2010 |
| KR | 10-2012-0105875 A | 9/2012 |

* cited by examiner

```
<LoA>
    <AI id="Asset1" src="video.vid" data_type="video"/>
    <AI id="Asset2" src="audio.au" data_type="audio/>
</LoA>
<STIA>
  <Scene>
     <video id="v1" x="0" y="0" width="1920" height="1080"
       begin="0sec" end="10sec" ref_Asset="Asset1"/>
     <audio id="a1" begin="0sec" end="10sec" ref_Asset="Asset2"/>
  </Scene>
</STIA>
```

```
<Scene width="1920" height="1080">
   <Area id="area1" x="0" y="0" width="1440" height="810"/>
        <video id="v1"    begin="0sec" end="10sec" ref_Asset="Asset1"/>
        <audio id="a1" begin="0sec" end="10sec" ref_Asset="Asset2"/>
   <Area id="area2" x="0" y="810" width="1920" height="270"/>
        <text id="t1" begin="0sec" end="10sec" ref_Asset="Asset3" />
   <Area id="area3" x="1440" y=" 0" width="480" height="810"/>
        <img id="i1" begin="0sec" end="10sec" ref_Asset="Asset4"/>
</Scene>
```

FIG.3

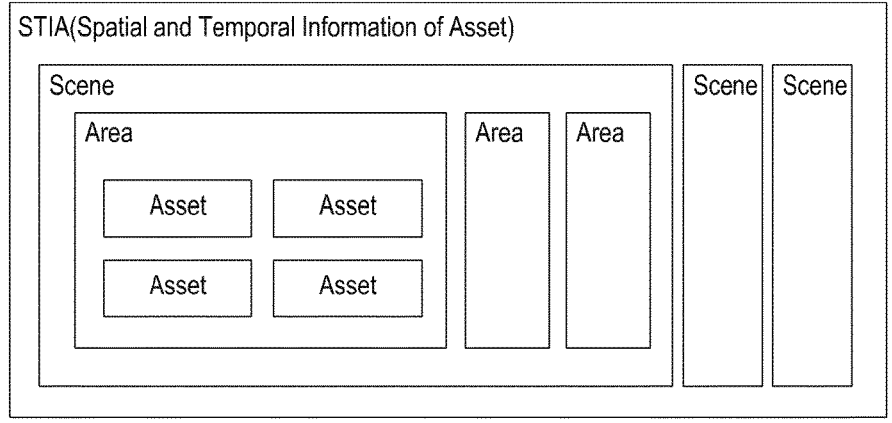

FIG.4

```
<STIA>
  <Scene id="scene1" width="1920" height="1080" begin="0sec" end="10sec">
    <Area id="area1" x="0" y="0" width="1440" height="810"/>
        <video id="v    ideo1" ref_Asset="Asset1"/>
        <audio id="audio1" ref_Asset="Asset2"/>
    <Area id="area2" x="0" y="810" width="1920" height="270"/>
        <text id="text1" ref_Asset="Asset3" />
    <Area id="area3" x="1440" y=" 0" width="480" height="810"/>
        <img id="image1" ref_Asset="Asset4"/>
  </Scene>
  <Scene id="scene2" width="1920"  height="1080" begin="0sec" end="20sec">
    <Area id="area4" x="0" y="0" width="960" height="1080">
        <video id="video   2" begin="v1.begin" ref_Asset="Asset1"/>
        <audio id="audio   2" begin="v1.begin" ref_Asset="Asset2"/>
    </Area>
    <Area id="area5" x="960" y="0" width="960" height="1080">
        <video id="video3" ref_Asset="Asset5/>
    </Area>
  </Scene>
</STIA>
```

FIG.7

APPARATUS AND METHOD FOR TRANSCEIVING SCENE COMPOSITION INFORMATION IN MULTIMEDIA COMMUNICATION SYSTEM

CROSS-REFERENCE TO RELATED APPLICATION(S)

This application is a continuation application of U.S. application Ser. No. 14/376,548 filed on Aug. 4, 2014, which was the U.S. National Stage application under 35 U.S.C § 371 of an International application filed on Feb. 4, 2013 and assigned application no. PCT/KR2013/000890, which claimed the benefit of a Korean patent application filed on Feb. 2, 2012 in the Korean Intellectual Property Office and assigned Serial number 10-2012-0010870 the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) UNIVERSITY-INDUSTRY COOPERATION GROUP OF KYUNG HEE UNIVERSITY.

TECHNICAL FIELD

The present disclosure relates to a device and a method for transmitting/receiving scene composition information in a multimedia communication system. More particularly, the present disclosure relates to a device and a method for transmitting/receiving scene composition information created in a form in which media attribute information and spatial-temporal information are separated from each other.

BACKGROUND

With the development of digital technologies, significant advances have been made in broadcasting-communication convergence. For example, a consumption environment for multimedia services such as images, music, and entertainment media has been expanded through broadcasting-communication convergence media such as an internet protocol tele-vision (hereinafter, referred to as 'IPTV'), a smart TV, and the like. The expansion of the consumption environment for the multimedia services has been made through the progression of a multimedia communication environment from the existing environment. That is, progression from an environment in which a service for one media is provided in one direction to an environment in which a variety of information can be simultaneously consumed due to the development of terminals and communication technologies. Also, the expansion has been through the generalization of media consumption for a consumer to obtain only desired information.

Scene composition information is provided together with a multimedia service. When various multimedia services, including a video service and an audio service, are provided, scene composition information represents spatial information and temporal information. The spatial information represents an area that is occupied by each media included in the multimedia service, and the temporal information represents a time point when each media has to be provided. The scene composition information is presented in the form of a markup language for explanation of an associative relationship between the media. The scene composition information is mainly presented using extensible markup language (XML) in order to express the spatial-temporal information for the various multimedia services. The scene composition information may also be used for multimedia services provided in a hybrid broadcasting environment utilizing the existing broadcasting network and internet network as well as the existing broadcasting environment. Accordingly, demands for scene composition information suitable for a multimedia environment such as the hybrid broadcasting environment are emerging.

In order to provide a multimedia service in a broadcasting environment, information required for identifying whether media data provided by the corresponding multimedia service can be used and for accessing the media data, and information required for accurately analyzing and displaying received media data are needed in an initial stage when the multimedia service is provided. Here, the information required for identifying whether the media data can be used and for accessing the media data, and the information required for accurately analyzing and displaying the received media data correspond to media attribute information.

However, scene composition information provided in the existing multimedia service is implemented in the form in which media attribute information is presented along with spatial-temporal information. Therefore, when the existing scene composition information is used to provide a multimedia service in a broadcasting environment, a process of identifying whether media data can be used and preparing for displaying of the media data may be performed after the scene composition information is completely interpreted. Furthermore, when identical media data is repetitively used for composing the corresponding scene, media attribute information is also repetitively generated in spite of the substantially identical media data.

Moreover, there exists one XML file per scene in the existing scene composition information. Therefore, when the entire scene is changed, a new XML file is used. Accordingly, when media data in the previous scene is continued in the next scene, continuity of the corresponding media data cannot be ensured. Consequently, it may be a problem to apply, in the same way, the existing scene composition information to a broadcasting environment in which media data has to be continuously reproduced.

In addition, as a scene is composed based on media data in the existing scene composition information, when some parts of the scene are independently composed, a complicated presentation is accordingly required. Also, when some parts of the scene are changed, a new XML file is required. However, such a new XML file cannot ensure the continuity of the media data as described above.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and a method for transmitting/receiving scene composition information in a multimedia communication system.

Another aspect of the present disclosure is to provide a device and a method for transmitting/receiving scene composition information, created in a form in which multimedia attribute information and spatial-temporal information are separated from each other, in a multimedia communication system.

In accordance with an aspect of the present disclosure, a method of transmitting scene composition information by a scene composition information transmitting device in a multimedia communication system is provided. The method includes creating scene composition information including media attribute information and spatial-temporal information, and transmitting the scene composition information, wherein the media attribute information and the spatial-temporal information are separated into separate formats.

In accordance with another aspect of the present disclosure, a method of receiving scene composition information by a scene composition information receiving device in a multimedia communication system is provided. The method includes receiving scene composition information including media attribute information and spatial-temporal information, and displaying a scene using the scene composition information, wherein the media attribute information and the spatial-temporal information are separated into separate formats.

In accordance with another aspect of the present disclosure, a device for transmitting scene composition information in a multimedia communication system is provided. The device includes a control unit configured to create scene composition information including media attribute information and spatial-temporal information, and a transmitting unit configured to transmit the scene composition information, wherein the media attribute information and the spatial-temporal information are separated into separate formats.

In accordance with another aspect of the present disclosure, a device for receiving scene composition information in a multimedia communication system is provided. The device includes a receiving unit configured to receive scene composition information including media attribute information and spatial-temporal information, and a control unit configured to control to display a scene using the scene composition information, wherein the media attribute information and the spatial-temporal information are separated into separate formats.

Embodiments of the present disclosure have an effect of making it possible to transmit/receive scene composition information in a multimedia communication system. Furthermore, embodiments of the present disclosure have an effect of making it possible to transmit/receive scene composition information, created in a form in which media attribute information and spatial-temporal information are separated from each other, in a multimedia communication system. Moreover, embodiments of the present disclosure have an effect of making it possible to transmit/receive scene composition information including multimedia initialization information in a multimedia communication system.

A method of providing scene composition information with initialization information for a multimedia service according to embodiments of the present disclosure may be usefully utilized for consuming the scene composition information in a broadcasting environment. Furthermore, a method of independently composing and updating a part of a scene according to embodiments of the present disclosure may be utilized in various services such as a multi-view or an N-screen on account of independently using the part of the scene. In addition, in making it possible to maintain continuity of media even when all or a part of a scene is changed, a scene-composition-information transmitting/receiving method according to embodiments of the present disclosure has an effect of suggesting a direction for development of other multimedia service technologies requiring a scene composing method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a view schematically illustrating a process of presenting a scene, such as the scene of FIG. 2, using CI according to an embodiment of the present disclosure;

FIG. 4 is a view schematically illustrating a structure of spatial and temporal information of asset (STIA) in an MMT system according to an embodiment of the present disclosure;

FIG. 7 is a view schematically illustrating a CI structure in which an STIA structure, such as the STIA structure as described in FIGS. 4 to 6, is considered according to an embodiment of the present disclosure;

DETAILED DESCRIPTION

Figures 1, 2:
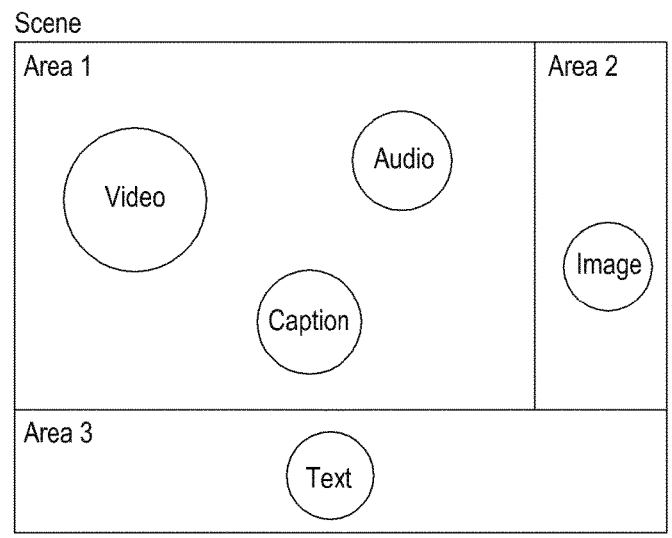
FIG. 1 is a view schematically illustrating a process of presenting an asset using composition information (CI) in an moving picture experts group (MPEG) media transport (MMT) system according to an embodiment of the present disclosure.
FIG. 2 is a view schematically illustrating a process of displaying a scene in an MMT system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the present disclosure provide a device and a method for transmitting/receiving scene composition information in a multimedia communication system.

Furthermore, embodiments of the present disclosure provide a device and a method for transmitting/receiving scene composition information, created in a form in which media attribute information and spatial-temporal information are separated from each other, in a multimedia communication system.

Hereinafter, in describing embodiments of the present disclosure, the multimedia communication system is assumed to be, for example, a moving picture experts group (MPEG) media transport (MMT) system, and it is apparent that the multimedia communication system may be an evolved packet system (EPS), a long-term evolution (LTE) mobile communication system, an institute of electrical and electronics engineers (IEEE) 802.16m communication system, or the like, as well as the MMT system.

In the present disclosure, a device and a method will be described for transmitting and receiving scene composition information, which is presented using, for example, extensible markup language (XML), in a multimedia communication system. However, the device and the method for transmitting and receiving scene composition information, proposed by embodiments of the present disclosure, may be applied as they are even when scene composition information presented using other formats as well as XML is used.

Scene composition information newly proposed by embodiments of the present disclosure is defined as composition information (CI). In displaying various pieces of media data on one terminal, the CI represents information expressing a time and a space on a screen on which the media data is displayed and information explaining an associative relationship between the media data displayed using the information expressing the time and the space on the screen on which the media data is displayed.

Media data to which the CI may be applied, such as video data, audio data, image data, text data, and the like, is defined as an asset. A list of assets used to compose one scene in a multimedia service is defined as a list of asset (LoA).

Information required for accessing an asset and information required for accurately analyzing a received asset and displaying it are defined as asset information (AI). Here, the information required for accessing the asset represents an address of a media source, and may be, for example, a uniform resource identifier (URI). The information required for accurately analyzing the received asset and displaying it may include a type, a format, and the like of media, and, for example, when media data is video data, may include a profile, a level, and the like corresponding to a media format.

A set of spatial information and temporal information for each asset included in CI is defined as spatial and temporal information of asset (STIA).

An entire area in which media data is displayed on a screen of a terminal is defined as a scene, and one scene includes one or more areas. Here, each area may be a partial area of the scene. Spatial information for a scene, an area, and an asset is defined as spatial information (SI), and temporal information for the scene, the area, and the asset is defined as temporal information (TI).

Furthermore, in using CI in a multimedia service, embodiments of the present disclosure propose a method of separating AI from STIA and providing it, a method of dividing a scene into areas and composing and managing the areas independently of the scene, and a method of maintaining continuity of an asset even when a scene or an area is changed.

A process of presenting an asset using CI in an MMT system according to an embodiment of the present disclosure will be described with reference to FIG. 1.

FIG. 1 is a view schematically illustrating a process of presenting an asset using CI in an MMT system according to an embodiment of the present disclosure.

Referring to FIG. 1, the CI includes media attribute information and temporal information. The media attribute information is presented through AI of each asset included in LoA, and the temporal information and spatial information is presented through STIA of each asset included in the LoA.

When the CI is presented as described above with reference to FIG. 1, media attribute information of an asset required for initialization may be simply acquired by analyzing only the LoA but not the entire CI. Here, as the CI is divided into the LoA and the STIA in an embodiment of the present disclosure, a connection relation between the LoA and the STIA is defined as asset connection information, and the asset connection information is referred to as ref Asset.

Furthermore, when the CI is presented as described above with reference to FIG. 1, if one asset is repetitively displayed in the same scene several times, the CI may additionally include only connection information ref Asset in the CI to reduce the amount of data required for presenting the CI, without having to repetitively present media attribute information for the corresponding asset.

With reference to FIG. 1, the process of presenting the asset using the CI in the MMT system according to an embodiment of the present disclosure has been described above, and a process of displaying a scene in an MMT system according to an embodiment of the present disclosure will next be described with reference to FIG. 2.

FIG. 2 is a view schematically illustrating a process of displaying a scene in an MMT system according to an embodiment of the present disclosure.

Referring to FIG. 2, the scene includes a plurality of areas, for example, Area 1, Area 2, and Area 3, and each of the plurality of areas includes an asset. Area 1 includes three assets, namely, a video asset, an audio asset, and a caption asset, Area 2 includes an image asset, and Area 3 includes a text asset.

Accordingly, as illustrated in FIG. 2, one scene is divided into the plurality of areas, and the assets included in each of the plurality of areas are subordinated to the corresponding area, so that the areas may be composed and changed independently of the scene. Consequently, when the scene is composed as illustrated in FIG. 2, each area may be independently used.

Referring to FIG. 2, the process of displaying the scene in the MMT system according to an embodiment of the present disclosure has been described above, and a process of presenting a scene using CI will next be described with reference to FIG. 3.

FIG. 3 is a view schematically illustrating a process of presenting a scene, such as the scene of FIG. 2, using CI according to an embodiment of the present disclosure.

Referring to FIG. 3, the areas which the scene includes are presented, and the assets included in the corresponding area are presented within the area.

Which area each of the areas represents within the corresponding scene should be presented, and therefore, SI of the corresponding area is included in the CI. Furthermore, the CI includes the SI of the scene in order to provide a criterion required for presenting the SI of each of the areas.

Furthermore, in order to reduce duplicate presentation of the SI, SI of the asset identical to the SI of the corresponding area in which the asset is included may be omitted.

As described above, the CI structure illustrated in FIG. 3 makes it possible to intuitively identify the structure of the scene, the areas, and the assets displayed on a screen, thereby achieving easy creation and edition of the CI.

With reference to FIG. 3, the process of presenting the scene of FIG. 2 using the CI has been described above, and a structure of STIA in an MMT system according to an embodiment of the present disclosure will next be described with reference to FIG. 4.

FIG. 4 is a view schematically illustrating a structure of STIA in an MMT system according to an embodiment of the present disclosure.

Referring to FIG. 4, there are a plurality of scenes illustrated in the STIA structure. A plurality of areas are included in each of the plurality of scenes, and a plurality of assets are included in each of the plurality of areas. In particular, the STIA structure illustrated in FIG. 4, when there are a plurality of convertible scenes included therein, does not need separate additional CI for conversion of the plurality of scenes, and therefore, even though a specific scene of the plurality of scenes is converted, playback related information of an asset may be maintained.

Likewise to this, in the STIA structure illustrated in FIG. 4, when there are a plurality of convertible areas in one scene, even though a specific area of the plurality of areas is converted, playback related information of an asset may be maintained.

With reference to FIG. 4, the STIA structure in the MMT system according to an embodiment of the present disclosure has been described above, and a structure of STIA and scenes in a time domain in an MMT system according to an embodiment of the present disclosure will next be described with reference to FIG. 5.

Figure 5:
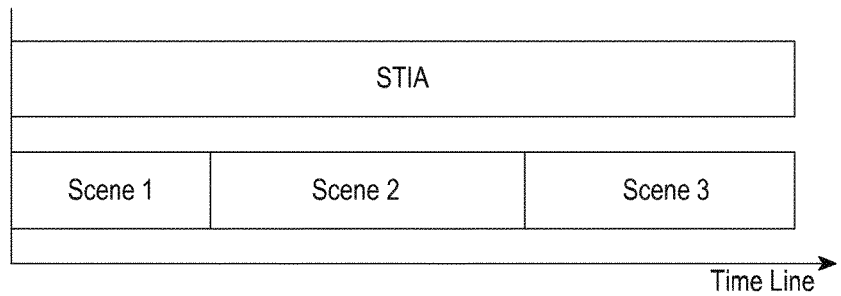
FIG. 5 is a view schematically illustrating a structure of STIA and scenes in a time domain in an MMT system according to an embodiment of the present disclosure.

FIG. 5 is a view schematically illustrating a structure of STIA and scenes in a time domain in an MMT system according to an embodiment of the present disclosure.

Referring to FIG. 5, in the time domain, the STIA represents that the scenes are activated in series based on a time axis. Although playback related information of an asset may be maintained irrespective of a conversion of the scenes as described in FIG. 4, a time axis on which all of the scenes may be considered is additionally required to maintain continuity of the asset. Accordingly, as illustrated in FIG. 5, the STIA is implemented in view of the time axis.

With reference to FIG. 5, the structure of the STIA and the scenes in the time domain in the MMT system according to an embodiment of the present disclosure has been described above, and a structure of a scene and areas in a time domain in an MMT system according to an embodiment of the present disclosure will next be described with reference to FIG. 6.

Figure 6:
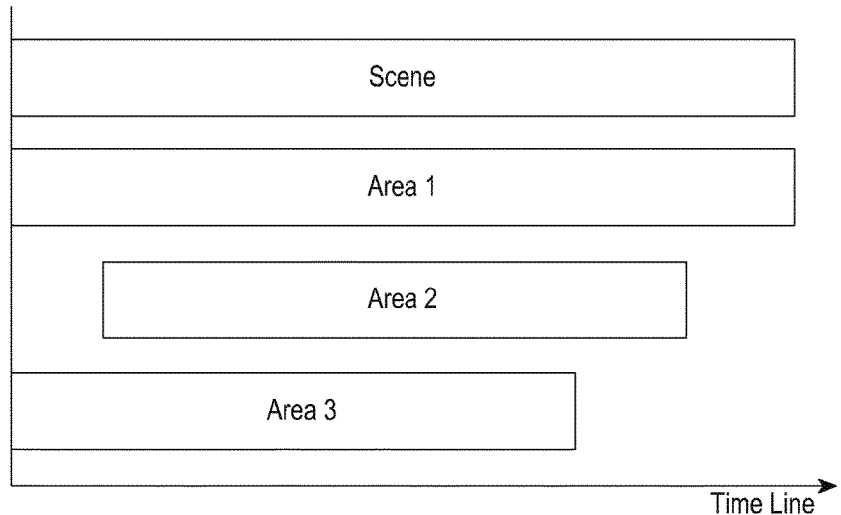
FIG. 6 is a view schematically illustrating a structure of a scene and areas in a time domain in an MMT system according to an embodiment of the present disclosure.

FIG. 6 is a view schematically illustrating a structure of a scene and areas in a time domain in an MMT system according to an embodiment of the present disclosure.

Referring to FIG. 6, in the time domain, the STIA represents that the areas are activated in parallel based on a time axis. Although playback related information of an asset may be maintained irrespective of a conversion of the areas as described in FIG. 4, a time axis on which all of the areas may be considered is additionally required to maintain continuity of the asset. Accordingly, as illustrated in FIG. 6, the STIA is implemented in view of the time axis, and thus, the scenes are also implemented in view of the time axis.

With reference to FIG. 6, the structure of the scene and the areas in the time domain in the MMT system according to an embodiment of the present disclosure has been described above, and with reference to FIG. 7, a CI structure will next be described in which such an STIA structure as described in FIGS. 4 to 6 is considered in an MMT system according to an embodiment of the present disclosure.

FIG. 7 is a view schematically illustrating a CI structure in which an STIA structure, such as the STIA structure as described in FIGS. 4 to 6, is considered according to an embodiment of the present disclosure.

Referring to FIG. 7, a CI structure in which an STIA structure as described in FIGS. 4 to 6 that reflects the structure of the scenes, the areas, and the assets is considered. First, scenes in the STIA have to be activated in series. Accordingly, each scene includes TI thereof to represent an activation time point and a deactivation time point, and when a previously described scene is deactivated, a next scene is activated.

Furthermore, areas included in one scene have to be activated in parallel. Accordingly, each area includes TI thereof to represent an activation time point and a deactivation time point. Here, when SI and TI existing within each of the scenes, the areas, and the assets are defined, an external reference may also exist to provide flexibility of presentation for the SI and the TI. In this way, in order to reduce duplicate presentation, when an asset has the same activation time as that of an area including itself, TI of the area may be omitted, and when an area has the same activation time as that of a scene including itself, TI of the area may be omitted. With reference to FIG. 7, the CI structure in which such an STIA structure as described in FIGS. 4 to 6 is considered has been described above, and the CI structure of FIG. 7 in a time domain will next be described with reference to FIG. 8.

Figure 8:
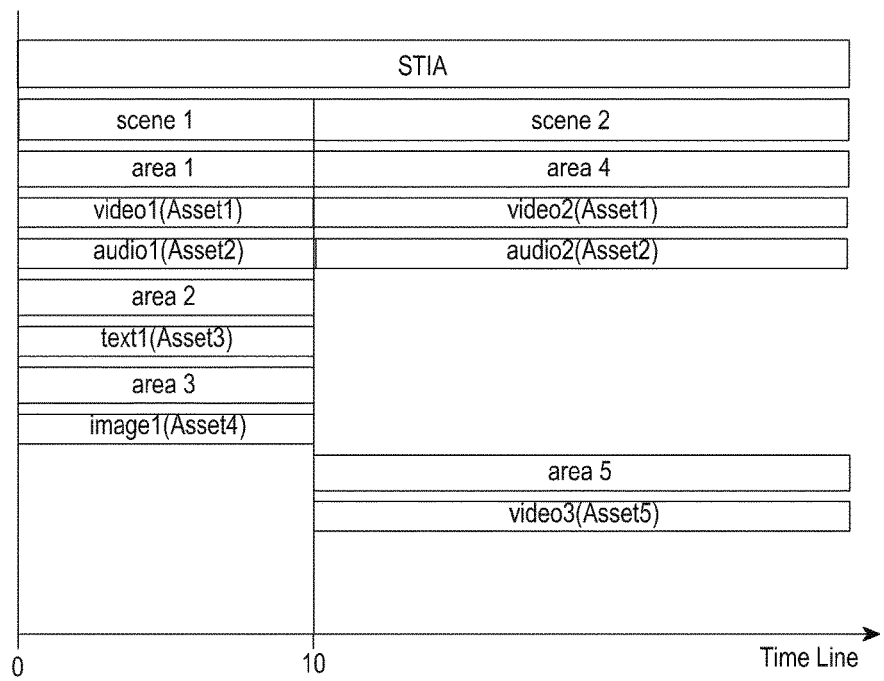
FIG. 8 is a view schematically illustrating the CI structure of FIG. 7 in a time domain according to an embodiment of the present disclosure.

FIG. 8 is a view schematically illustrating the CI structure of FIG. 7 in a time domain according to an embodiment of the present disclosure.

Referring to FIG. 8, although Scene 1 is changed to Scene 2 in 10 seconds after activation of STIA, Asset 1 and Asset 2 identically appear in Area 1 and Area 4. In this case, playback time information, which Asset 1 and Asset 2 included in Scene 1 have, is used for Asset 1 and Asset 2 included in Scene 2 as it is, so that continuity of the assets may be maintained.

With reference to FIG. 8, the CI structure of FIG. 7 in the time domain has been described above, and with reference to FIG. 9, a CI structure will next be described in which media attribute information of an asset may be separated into separate formats using an LoA, continuity of an asset may be maintained even when a scene or an area is changed, and a part of a scene may be independently composed and managed as an area in an MMT system according to an embodiment of the present disclosure.

Figure 9:
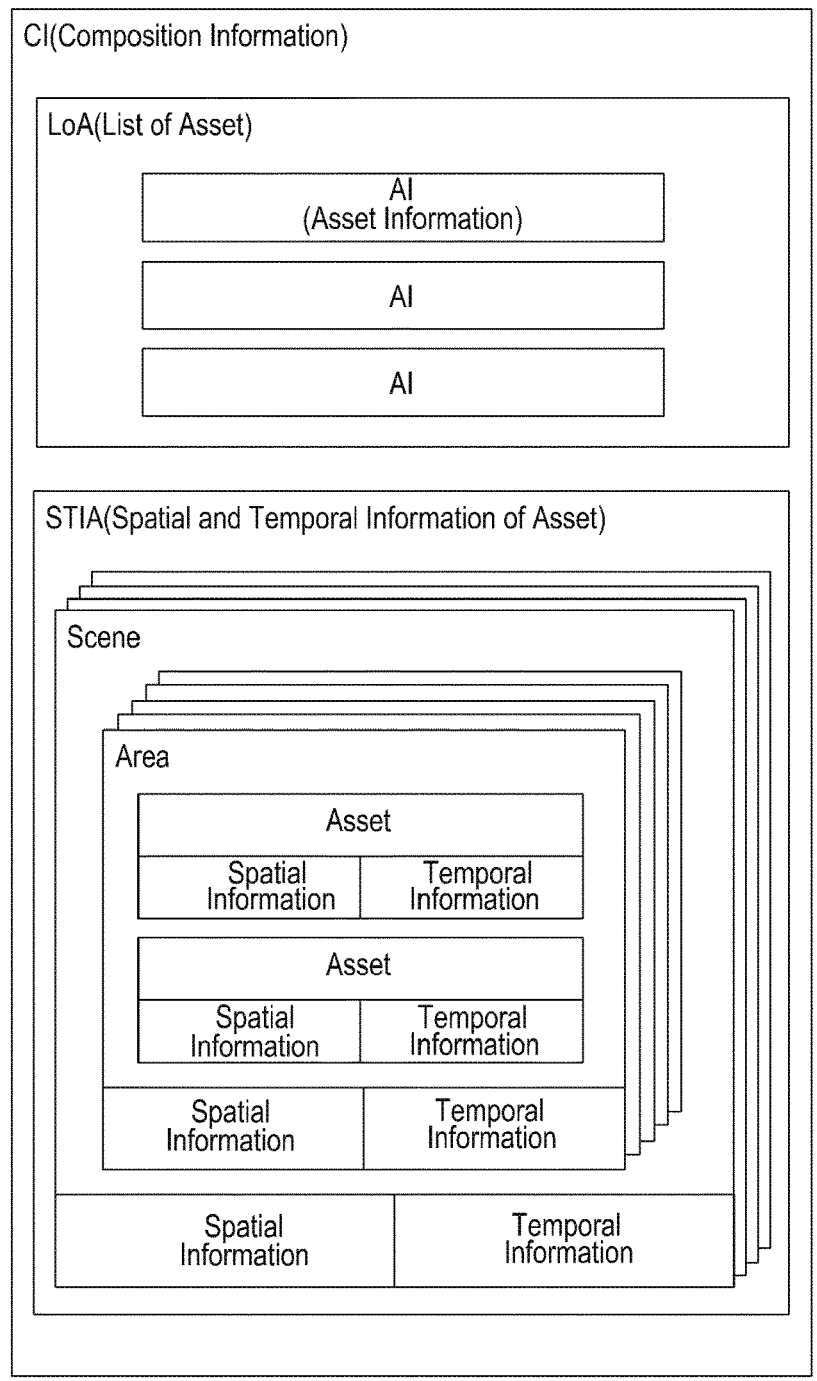
FIG. 9 is a view schematically illustrating a CI structure in which media attribute information of an asset may be separated into separate formats using a list of asset (LoA), continuity of an asset may be maintained even when a scene or an area is changed, and a part of a scene may be independently composed and managed as an area in an MMT system according to an embodiment of the present disclosure.

FIG. 9 is a view schematically illustrating a CI structure in which media attribute information of an asset may be separated into separate formats using an LoA, continuity of an asset may be maintained even when a scene or an area is changed, and a part of a scene may be independently composed and managed as an area in an MMT system according to an embodiment of the present disclosure.

Referring to FIG. 9, media attribute information of an asset is separated into separate formats using an LoA. Furthermore, STIA is implemented to be separate from the LoA such that continuity of an asset may be maintained even when a scene or an area is changed, and a part of a scene may be independently composed and managed as an area.

Figure 10:
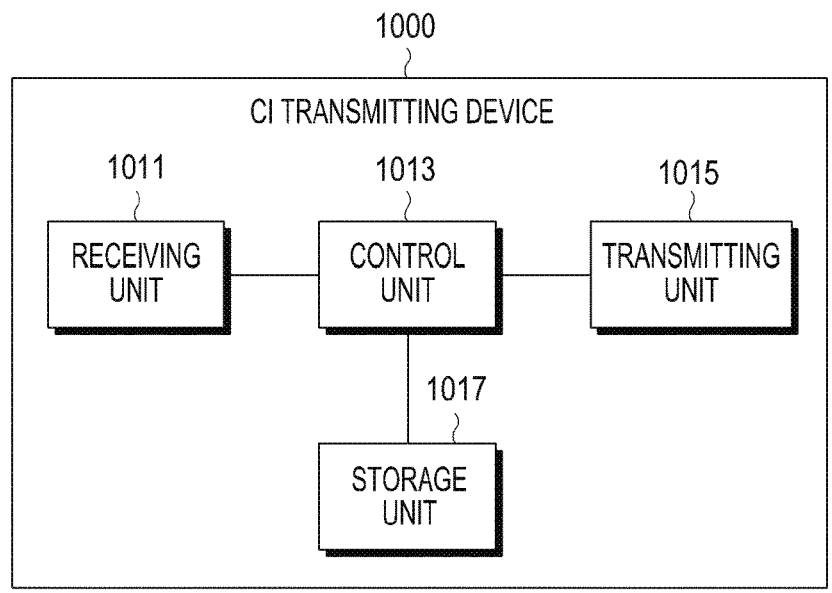
FIG. 10 is a block diagram schematically illustrating an internal structure of a CI transmitting device in an MMT system according to an embodiment of the present disclosure.

With reference to FIG. 9, the CI structure has been described above in which the media attribute information of the asset may be separated into the separate formats by using the LoA, the continuity of the asset may be maintained even when the scene or the area is changed, and the part of the scene may be independently composed and managed as the area in the MMT system according to an embodiment of the present disclosure, and an internal structure of a CI transmitting device in an MMT system according to an embodiment of the present disclosure will next be described with reference to FIG. 10.

FIG. 10 is a block diagram schematically illustrating an internal structure of a CI transmitting device in an MMT system according to an embodiment of the present disclosure.

Referring to FIG. 10, a CI transmitting device 1000 includes a receiving unit 1011, a control unit 1013, a transmitting unit 1015, and a storage unit 1017.

The control unit 1013 controls overall operations of the CI transmitting device. The control unit 1013 controls to perform overall operations related to an operation of transmitting CI for implementing, particularly, an LoA and STIA according to an embodiment of the present disclosure as separate formats. Here, the overall operations related to the operation of transmitting the CI are the same as those described with reference to FIGS. 1 to 9, and therefore, detailed descriptions thereof will be omitted.

The receiving unit 1011 receives various types of signals from a CI receiving device, etc. under the control of the control unit 1013. Here, the various types of signals received by the receiving unit 1011 are the same as those described with reference to FIGS. 1 to 9, and therefore, detailed descriptions thereof will be omitted.

The transmitting unit 1015 transmits various types of signals to the CI receiving device, etc. under the control of the control unit 1013. Here, the various types of signals transmitted by the transmitting unit 1015 are the same as those described with reference to FIGS. 1 to 9, and therefore, detailed descriptions thereof will be omitted.

The storage unit 1017 stores the various types of signals received by the receiving unit 1011, and various types of data required for an operation of the CI transmitting device, particularly, information related to the operation of transmitting the CI.

Meanwhile, although the receiving unit 1011, the control unit 1013, the transmitting unit 1015, the storage unit 1017, and the output unit 1019 are implemented as separate units in FIG. 10, it is apparent that the receiving unit 1011, the control unit 1013, the transmitting unit 1015, the storage unit 1017, and the output unit 1019 can be implemented as one integrated unit.

With reference to FIG. 10, the internal structure of the CI transmitting device in the MMT system according to an embodiment of the present disclosure has been described above, and an internal structure of a CI receiving device in an MMT system according to an embodiment of the present disclosure will next be described with reference to FIG. 11.

Figure 11:
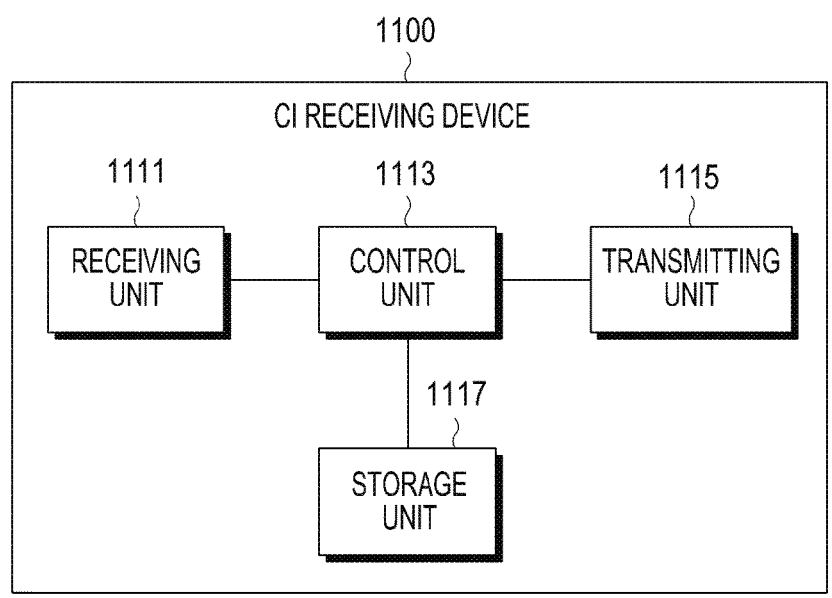
FIG. 11 is a block diagram schematically illustrating an internal structure of a CI receiving device in an MMT system according to an embodiment of the present disclosure.

FIG. 11 is a block diagram schematically illustrating an internal structure of a CI receiving device in an MMT system according to an embodiment of the present disclosure.

Referring to FIG. 11, a CI receiving device 1100 includes a receiving unit 1111, a control unit 1113, a transmitting unit 1115, and a storage unit 1117.

The control unit 1113 controls overall operations of the CI receiving device. The control unit 1013 controls to perform overall operations related to an operation of receiving CI for implementing, particularly, an LoA and STIA according to an embodiment of the present disclosure as separate formats. Here, the overall operations related to the operation of receiving the CI are the same as those described with reference to FIGS. 1 to 9, and therefore, detailed descriptions thereof will be omitted.

The receiving unit 1111 receives various types of signals from a CI transmitting device under the control of the control unit 1113. Here, the various types of signals received by the receiving unit 1011 are the same as those described with reference to FIGS. 1 to 9, and therefore, detailed descriptions thereof will be omitted.

The transmitting unit 1115 transmits various types of signals to the CI transmitting device under the control of the control unit 1113. Here, the various types of signals transmitted by the transmitting unit 1115 are the same as those described with reference to FIGS. 1 to 9, and therefore, detailed descriptions thereof will be omitted.

The storage unit 1117 stores the various types of signals received by the receiving unit 1111, information related to operations of the CI receiving device, and the like.

Meanwhile, although the receiving unit 1111, the control unit 1113, the transmitting unit 1115, and the storage unit 1117 are implemented as separate units in FIG. 11, it is apparent that the receiving unit 1111, the control unit 1113, the transmitting unit 1115, and the storage unit 1117 can be implemented as one integrated unit.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of receiving information for multimedia content, the method comprising:
    receiving the information for the multimedia content comprising:
        initial information of an asset, and
        spatial information and temporal information of the asset comprising temporal information related to scenes, and the temporal information related to the scenes including temporal information related to at least one area of a scene; and
    displaying at least one scene using the information for the multimedia content,
    wherein the initial information is separate from the spatial information and the temporal information,
    wherein the spatial information and temporal information include scene id, and area id related to the scene, and
    wherein the temporal information related to the scenes represents that the scenes are activated in series based on a time axis.

2. A device for receiving information for multimedia content, the device comprising:
    a receiver configured to receive the information for the multimedia content comprising:
        initial information of an asset, and
        spatial information and temporal information of the asset comprising temporal information related to scenes, and the temporal information related to the scenes including temporal information related to at least one area of a scene; and
    at least one processor configured to control a display of at least one scene based on the information for the multimedia content,
    wherein the initial information is separate from the spatial information and the temporal information,
    wherein the spatial information and temporal information include scene id, and area id related to the scene, and
    wherein the temporal information related to the scenes represents that the scenes are activated in series based on a time axis.

* * * * *